United States Patent [19]

May et al.

[11] Patent Number: 5,652,316
[45] Date of Patent: Jul. 29, 1997

[54] UNIVERSALLY COMPATIBLE PIGMENT DISPERSANTS

[75] Inventors: Michael May, Griesheim; Werner Höss, Heusenstamm; Gerhard Markert, Ober-Ramstadt; Werner Siol, Darmstadt, all of Germany

[73] Assignee: Roehm GmbH Chemische Fabrik, Darmstadt, Germany

[21] Appl. No.: 575,887

[22] Filed: Dec. 20, 1995

[30] Foreign Application Priority Data

Dec. 20, 1994 [DE] Germany .................... 44 45 498.8

[51] Int. Cl.⁶ ............................................ C08F 26/00
[52] U.S. Cl. .................... 526/312; 526/264; 526/265; 526/270
[58] Field of Search ............................ 526/312, 264, 526/265, 270

[56] References Cited

U.S. PATENT DOCUMENTS

| | | | |
|---|---|---|---|
| 3,945,843 | 3/1976 | Holty et al. . | |
| 3,991,007 | 11/1976 | Perronin et al. . | |
| 4,325,862 | 4/1982 | Schuster | 526/312 |
| 4,388,434 | 6/1983 | Swift et al. | 526/281 |
| 5,098,479 | 3/1992 | Hutter | 526/312 |
| 5,116,924 | 5/1992 | Bung et al. | 526/312 |
| 5,169,886 | 12/1992 | Bung et al. | 526/312 |

FOREIGN PATENT DOCUMENTS

| | | | |
|---|---|---|---|
| 0022746 | 1/1981 | European Pat. Off. . | |
| 0033213 | 8/1981 | European Pat. Off. . | |
| 0311157 | 4/1989 | European Pat. Off. . | |
| 0340976 | 11/1989 | European Pat. Off. . | |
| 57-109870 | 7/1982 | Japan | 526/312 |
| 57-158275 | 9/1982 | Japan | 526/312 |
| 58-52310 | 3/1983 | Japan | 526/312 |
| 61-31410 | 2/1986 | Japan | 526/312 |
| 4-34055 | 2/1992 | Japan | 526/312 |

OTHER PUBLICATIONS

Dainippon JP90–25157 (Feb. 6, 1990) "Resin Compositions for weather–resistant coating materials" computer–generated Abstract pp. 19–21.

Mitsubishi JP83–132049 (Jun. 20, 1983) "Concentrated Pearly agents for Cosmetics" Computer generated abstract, pp. 50–52.

*Primary Examiner*—Joseph L. Schofer
*Assistant Examiner*—N. Sarofim
*Attorney, Agent, or Firm*—Oblon, Spivak, McClelland, Maier & Neustadt, P.C.

[57] ABSTRACT

The invention is a copolymer P, dispersant for dyes and/or pigments in standard plastic substances SK, wherein P exhibits a universal compatibility with standard plastics SK, with the feature that copolymer P is synthesized from monomer units:

(m1) methyl methacrylate, (m2) (meth)acrylate of formula I:

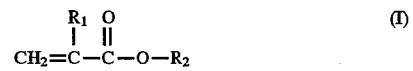

(m3) (meth)acryl compound of formula II:

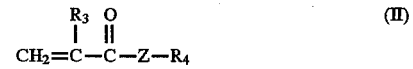

and optionally (m4) methacrylate of formula III:

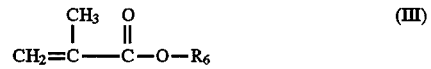

8 Claims, No Drawings

UNIVERSALLY COMPATIBLE PIGMENT DISPERSANTS

BACKGROUND OF THE INVENTION

1. Field of the Invention

The invention concerns copolymers P suitable as diapersants for dyes and/or pigments in plastics, wherein P exhibits a universal polymer compatibility.

2. Discussion of the Background

Dispersants for dyes or pigments in plastics consisting of copolymers which contain acrylate or methacrylate comonomer units are known. EP-A 33,213 describes copolymers which contain, as comonomer units, substituted vinylaromatics and/or (meth)acrylates, a polymerizable heterocyclic compound with an N and an O atom in the heterocycle, and optionally, an $\alpha,\beta$-unsaturated carboxylic acid. Such copolymers act as diapersants for inorganic or organic pigments and dyes in lacquer preparations, wherein the compatibility with the resins which make up the lacquers, such as alkyd resins, epoxy resins, or amino plastic resins, is emphasized. An improvement of the dispersing capacity is found with copolymers, if (meth)acrylic acid is used as the $\alpha,\beta$-unsaturated acid in fractions of 0.2 to 5 wt %.

EP-A 252,798 describes compatible pigment diapersants for paints, lacquers, inks, and adhesives, consisting of telomers or cotelomers, synthesized from acrylic and/or methacrylic acid esters, where the telomers generally have average molecular weights $M_w$ between $10^2$ and $5 \times 10^3$ daltons.

EP-A 340,976 describes, among other things, pigment dispersions containing 1 to 50 wt % of a (meth)acrylic polymer as a pigment dispersant, with monomer units having primary amino groups on a tertiary carbon atom, 10 to 90 wt % of a pigment, and a liquid in which pigment and pigment dispersant are dispersed. These pigment preparations are preferably used in liquid coating agents.

EP-A 311,157 describes polymeric dispersants for pigments or dyes, consisting of 0 to 80 mol % vinylaromatics, 0 to 70 mol % alkyl (meth)acrylates, 5 to 50 mol % monomer units with a heterocyclic group, which has at least one ring nitrogen atom in the ring, 0 to 10 mol % crosslinking monomer units, and 0 to 20 mol % other copolymerizable monomer units. These polymers exhibit good compatibility with polymeric binders for coating agents or inks, in particular with binders based on polyacrylate and alkyd resin.

EP-A 22,746 describes copolymers of alkyl or cycloalkyl methacrylates with 4 to 6 carbon atoms in the ester radical and aminoalkyl (meth)acrylates as a pigment dispersant, wherein the mixtures of pigment and pigment dispersant are compatible with various substrates, such as paints, inks, and plastics. The mixing of the copolymer and pigment is effected by melt-mixing or mixing in a solvent with the solvent removed subsequently.

All the known pigment dispersants have dispersing polymers which contain cycloalkyl (meth)acrylate as a comonomer unit. From EP-A 321,878 (=U.S. Pat. Nos. 4,906,699 and 5,219,935), it is known that copolymers of methyl methacrylate and cyclohexyl methacrylate, grafted onto crosslinked elastomer phases, can be used as universal impact resistance modifiers for various plastics. Universal impact resistance modification is based on the principle that copolymers of 50 to 95 wt % methyl methacrylate and 5 to 50 wt % cycloalkyl (meth)acrylate with 5 to 7 carbon atoms in the ring, are thermodynamically compatible with a large number of plastics; these copolymers form transparent polymer alloys with plastics. Such a universal compatibility with plastics is also claimed for the pigment dispersants according to EP-A 22,746. However, if the term "compatibility" is defined as thermodynamic polymer compatibility, then this claim is not correct for some important plastics, such as styrene-acrylonitrile copolymers, methyl methacrylate copolymers or polycarbonate, with which the pigment dispersants claimed in EP-A 22,746 are not thermodynamically compatible.

SUMMARY OF THE INVENTION

An object of the invention is to provide pigment dispersants which are compatible with a broad spectrum of standard plastics and which exhibit sufficient adhesion on the surface of the color pigment particles or in which molecular dyes dissolve well.

Another object of the invention is to provide a pigment dispersant having compatibility between plastic and the pigment dispersant, to ensure that the optical and mechanical properties of the plastic remain unaffected to the greatest possible extent.

Surprisingly, it was discovered that copolymers P, containing monomer units:

(m1) 30 to 94.5 wt % methyl methacrylate, (m2) 5 to 50 wt % (meth)acrylate of formula I:

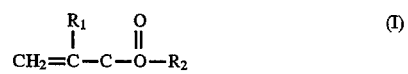

wherein:

$R_1$ stands for hydrogen or methyl, and $R_2$, for a substituted or unsubstituted cycloalkyl radical with 5 to 7 ring carbon atoms;

(m3) 0.5 to 20 wt % (meth)acryl compound of formula II:

wherein:

$R_3$ stands for hydrogen or methyl, $R_4$, for a substituent containing at least one oxygen and/or a nitrogen atom, and Z, for O, NH, or $NR_5$ with $R_5$=alkyl with 1 to 6 carbon atoms or $R_5$=$R_4$; and optionally (m4) 0.5 to 30 wt % methacrylate of formula III:

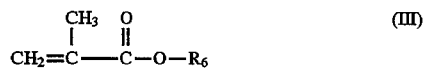

wherein $R_6$ stands for an optionally branched, substituted or unsubstituted, alkyl radical with 3 to 24 carbon atoms, and wherein comonomers (m1), (m2), and (m3), and optionally (m4) can supplement each other to make up 100 wt %. These copolymers are excellent as pigment and dye dispersants for a broad spectrum of standard plastics, such as polymethyl methacrylate (PMMA); polystyrene (PS); poly-$\alpha$-methylstyrene (P-$\alpha$-MS); copolymers containing at least 50 wt % methyl methacrylate, styrene, or $\alpha$-methylstyrene; styrene-acrylonitrile copolymers (SAN); acrylonitrile-butadiene-styrene terpolymers (ABS); polyolefins, such as polyethylene or polypropylene; polycarbonate (PC); polyester carbonates; polyvinyl chloride (PVC); chlorinated rubber; or polyvinylidene fluoride (PVDF). In a preferred specific embodiment of the invention, the comonomer (m4) is present in quantities of 1 to 25 wt % in copolymer P.

Furthermore, copolymers P with average molecular weights $M_w$, between $5 \times 10^3$ and $5 \times 10^4$ daltons, having reduced viscosities of 5 to 30 mL/g according to DIN 51,562 in chloroform at 25° C. (for the determination of $M_w$, see, for example, H. F. Mark et al., Encyclopedia of Polymer Science and Technology, 2nd Ed., Vol. 10, pp. 1ff., John Wiley, New York, 1989).

Preferred monomers (m3) in copolymer P are dialkylaminoalkyl (meth)acrylates, dialkylaminoalkyl(meth) acrylamides, alkoxy (meth)acrylates, as well as alkyl (meth) acrylates and alkyl(meth)acrylamides with heterocycles that have at least one oxygen and/or nitrogen atom as substituents on the alkyl ester or alkyl amide radical.

DETAILED DESCRIPTION OF THE INVENTION

Monomers (m2), (m3), and (m4)

Monomers (m2) are known. Examples include cyclopentyl (meth)acrylate, cyclohexyl (meth)acrylate, and 4-methylcyclohexyl (meth)acrylate.

The following are examples of monomers (m3): dialkylaminoalkyl (meth)acrylates, such as N,N-dimethylaminopropyl (meth)acrylate, N,N-dimethylaminobutyl (meth)acrylate, N,N-diethylaminopropyl (meth)acrylate, N,N-diethylaminoethyl (meth)acrylate, or preferably N,N-dimethylaminoethyl (meth)acrylate; dialkylaminoalkyl(meth)acrylamides, such as N,N-diethylaminoethyl(meth)acrylamide, N,N-dimethylaminopropyl(meth)acrylamide, N,N-diethylaminobutyl(meth)acrylamide or preferably N,N-dimethylaminoethyl(meth)acrylamide; alkyl (meth) acrylates, or alkyl(meth)acrylamides with heterocycles as substituents, which have at least a nitrogen and/or oxygen atom in the heterocycle, such as furfuryl (meth)acrylate, tetrahydrohydrofurfuryl (meth)acrylate, 2,2,6,6-tetramethylpiperidinyl (meth)acrylate, 2-N-morpholinoethyl (meth)acrylate, 2-N-pyridinylethyl (meth)acrylate or 2-N-piperazinylethyl (meth)acrylate, and N-(4-morpholinomethyl)(meth)acrylamide, N-(1-piperidinylmethyl)(meth)acrylamide, N-methacryloyl-2-pyrrolidone, N-(methacrylamidomethyl)pyrrolidone, N-(acrylamidomethyl)pyrrolidone, N-(methacrylamidomethyl)caprolactam, N-(acrylamidomethyl)caprolactam, or 2-N-pyridinylethyl (meth)acrylamide, and other heterocyclic compounds, which are listed in EP-A 311,157 and which exhibit a (meth)acrylate or a (methy)acrylamide group; alkoxy (meth) acrylates, such as 2-ethoxyethyl (meth)acrylate, 2-methoxyethyl (meth)acrylate, 2-butoxyethyl (meth) acrylate, or 2-(ethoxyethoxy)ethyl (meth)acrylate.

Examples of monomers (m4) are: n-propyl methacrylate, isopropyl methacrylate, isobutyl methacrylate, n-pentyl methacrylate, n-hexyl methacrylate, 2-ethylhexyl methacrylate, n-octyl methacrylate, n-decyl methacrylate, n-dodecyl methacrylate, n-tetradecyl methacrylate, n-hexadecyl methacrylate, n-octadecyl methacrylate, n-eicosyl methacrylate, and preferably n-butyl methacrylate.

Preparation of copolymers P

Copolymers P are formed, in a known manner, from monomers (m1), (m2), (m3), and optionally (m4) by a radical, anionic, or group-transfer polymerization (see in this regard, for example, H. Rauch-Puntigam, Th. Vöker, *Acryl- und Methacrylverbindungen* [*Acrylic and methacrylic compounds*], Springer, Heidelberg, 1967; Houben-Weyl, 4th Ed., Volume XIV/1, pp. 1010ff., Thieme, Stuttgart, 1961). The polymerization of copolymers P can be carried out in bulk, suspension, emulsion, or solution.

In radical polymerization, peroxide compounds, in particular organic peroxides, such as dibenzoyl peroxide or lauroyl peroxide, azo compounds, such as azodiisobutyronitrile, or redox initiators are preferably used in quantities of 0.01 to 5 wt %, based on the monomer fractions.

The radicals triggering the polymerization can also be produced by high-energy radiation. Molecular weight regulators which can be taken into consideration are, for example, traditional sulfur compounds, such as mercapto compounds in quantities of 0.2 to 8 wt %, based on the monomer fractions. In general, the average molecular weights $M_w$ of copolymers P generally lie between $5 \times 10^3$ and $5 \times 10^4$ daltons, preferably between $10^4$ and $3 \times 10^4$ daltons.

Copolymers P contain the following: methyl methacrylate units, 30 to 94.5 wt %, preferably 45 to 88 wt %, based on the total monomers; monomer units (m2), 5 to 50 wt %, preferably 10 to 45 wt %; and monomer units (m3), 0.5 to 20 wt %, preferably 2 to 15 wt %. In a particularly preferred specific embodiment of the invention, copolymers P also contain 0.5 to 30 wt %, preferably 1 to 25 wt %, of monomer units (m4), which generally influence the melt flow behavior and the compatibility of copolymers P with the standard plastics to be dyed in a favorable way, and thus improve the compoundability of the pigments and the pigment dispersants P or the mixtures.

With a large number of standard plastics SK, such as polymethyl methacrylate (PMMA), copolymers of methyl methacrylate and optionally substituted styrenes, polystyrene (PS), poly-α-methylstyrene (P-α-MS), styrene-acrylonitrile copolymers (SAN), acrylonitrile-butadiene-styrene terpolymers, polyolefins, such as polyethylene or polypropylene, polycarbonate (PC), polyester carbonate, polyvinyl chloride (PVC), chlorinated rubber, or polyvinylidene fluoride (PVDF), copolymers P form compatible polymer mixtures PM, whose characterization takes place according to recognized criteria (see in this regard, for example, Kirk-Othmer, Encyclopedia of Chemical Technology, Vol. 18, pp. 457–460, Wiley Interscience, New Work, 1981, J. Brandrup, E. H. Immergut, Polymer Handbook, 2nd Ed., Chapter III, pp. 211ff., Wiley Interscience, New York, 1975).

The compatible polymer mixtures PM of amorphous plastics SK and copolymer P has one refractive index and one single glass transition temperature, which lies between the glass transition temperatures of copolymer P and standard plastic SK. As another indication of the compatibility, one can cite the appearance of the LCST (Lower Critical Solution Temperature), whose existence is based on the process that during heating, the transparent mixture, which was clear up to then, is separated into dissimilar phases and becomes optically cloudy, which is clear evidence that the original polymer mixtures consisted of a single phase in thermodynamic equilibrium (see in this regard, for example, D. R. Paul, Polymer Blend & Mixtures, pp. 1ff., Martinus Nijhoff Publishers, Dordrecht, Boston, 1985).

Pigments and dyes

As pigments in the preparations of the invention, containing pigment and copolymer P, both inorganic and organic pigments can be used. Suitable inorganic pigments are, for example: aluminum oxide hydrate, antimony oxide, barium sulfate, bronze powder, cadmium oxide, cadmium sulfide, calcium carbonate, calcium silicate, lead sulfate, lead chromate, lead oxide, lead chromate molybdate, chromium oxides, chromium antimony titanate, cobalt aluminate, iron oxides, graphite, mercury oxide, mercury sulfide, nickel titanate, silicon dioxide, silicon chromate, strontium chromate, magnesium silicate, titanium dioxide, ultramarine blue, zinc oxide, zinc chromate, zinc sulfide, or zirconium dioxide (see in this regard, for example: Kirk-Othmer, Encyclopedia of Chemical Technology, 3rd., Ed., Vol. 17, pp. 788–838, Wiley Interscience, New York, 1982, *Ullmanns Encyclopädie der Technischen Chemie* [*Ullmann's Encyclopedia of Technical Chemistry*], 4th Ed., Vol. 18, pp. 545–660, Verlag Chemie, Weinheim, 1979).

Examples of organic pigments are the following: phthalocyanine blue, phthalocyanine green, Malachite Green, Naphthol Red, toluidine red, pyrazolone red, rhodamine, alizarin, Hansa Yellow, anthraquinone, dianisidine orange (see in this regard: Kirk-Othmer, loc. cit., Vol. 17, pp. 838–871; *Ullmanns Encyclopädie der Technischen Chemie*, 4th Ed., Vol. 18, pp. 661–695, Verlag Chemie, Weinheim, 1979).

The pigments are present in more or less large, occasionally crystal-like agglomerates and are broken up into smaller agglomerates by the pigment dispersants. The dyes are generally dissolved molecularly in the plastic substrate and are to be distinguished from the pigments. However, the solubility of many dyes in standard plastics is poor or the dye intensity of many dyes is too large, so that a direct metering in of the dyes into the plastic melt is not possible. Even in such cases, copolymers P of the invention are excellent as dye dispersants. Examples of such dyes are the following: azo compounds, stilbene compounds, carotinoid dyes, di- and triarylmethane compounds, methine and polymethine compounds or thiazine compounds (see in this regard, Kirk-Othmer, loc. cit., Vol. 8, pp. 159–212, Wiley Interscience, New York, 1979). Such dyes are generally linked by physical interactions, such as hydrogen bonds or dipolar interactions, to copolymer P and/or to the standard plastic SK. The optical properties of such dyes are determined by electron transitions between molecule orbitals, whereas the optical properties of pigments are, moreover, influenced by the structure of the pigment particles. In contrast to the dyes, the pigments retain the primary particle form (crystallites) unchanged during the compounding steps.

Mixtures M of pigments and dyes with copolymers P

Mixtures M of pigments or dyes with copolymer P, in accordance with the invention, are produced by conventional mixing methods, such as melt-mixing or mixing in a solvent.

In general, mixtures MP of pigments and copolymers P contain 0.1 to 95 wt %, preferably 0.2 to 75 wt %, particularly preferably 0.5 to 70 wt %, pigment, with the fraction of copolymer P supplemented to make up 100 wt %. Possible amounts of copolymer P are 99.5–5 wt %, 99.8–25 wt. % and 99.5–30 wt %.

Mixtures MF of dyes and copolymers P contain 0.05 to 50 wt %, preferably 0.1 to 25 wt %, particularly preferably 0.2 to 15 wt %, dye, with the fraction of copolymer P supplemented to make up 100 wt %. Possible amounts of copolymer P are 99.95–50 wt %, 99.9–75 wt % and 99.8–85 wt %. For the production of mixtures MP or MF, the generally powdery pigments or dyes are first premixed with copolymers P typically present in granulated form or as material to be ground in slowly running mixing units, such as drum, gyrowheel or double-chamber plough bar mixers. These slowly running mixing units usually produce a mechanical mixing without elimination of the phase boundaries (see, for example, *Ullmanns Encyclopädie der Technische Chemie*, 4th Ed., Vol. 2, pp. 282–311, Verlag Chemie, Weinheim, New York, 1980). Premixtures produced in such a manner are thermoplastically prepared with homogeneous mixing of the aforementioned mixture components in the melt, using heatable mixing units at suitable temperatures, for example, 150° to 300° C., in kneaders or preferably in extruders, such as in single- or multiple-screw extruders or perhaps in extruders with an oscillating screw and with shear pins (kneaders from the BUSS COMPANY). With these methods, uniform-grain granulated materials with particle sizes of 2 to 5 mm are produced. The granulated materials contain a thermoplastic fraction, synthesized from copolymer P, and the pigments or dyes embedded therein.

In another specific embodiment of the invention, copolymer P is dissolved in a suitable solvent, and the pigment is dispersed in the resulting solution (or the dye is dissolved in the solution). This can be carried out, for example, with the aid of shaking devices or a ball mill. The solvent can be removed directly after the mixing process, or mixture M of copolymer P and the pigment or dye can be precipitated from the solution with suitable precipitating agents in order to isolate mixtures M. The preparation of mixtures M with the aid of solvents is taken into consideration, in particular for high pigment or dye concentration, generally above 75 wt %. In these high concentrations, the pigment or dye particles are present separately, coated with copolymer P, and copolymer P no longer forms a cohesive phase.

Working of mixtures M into standard plastics SK

Standard plastics SK, into which mixture M of pigments or dyes with copolymer P is worked as a universally acting dispersant, form compatible mixtures with copolymer P. This results in mixtures SKMF of transparent standard plastics SK and mixtures MF (mixtures of copolymer P and dyes) also being transparent.

Mixtures SKMP of standard plastics SK and pigment-dispersant preparations MP generally contain 0.5 to 80 wt %, preferably 1 to 70 wt %, particularly preferably 2 to 50 wt %, mixture MP of copolymer P and pigment, with the fraction of SK supplemented to make up 100 wt %. Amounts of SK generally fall in the range 99.5–20 wt. %, 99–30 or 98–50 wt. %. For the preparation of mixtures SKMP, generally granulated or powdery mixtures MP are first mixed mechanically in slowly running mechanical mixing units, without eliminating the phase boundaries (as described in the preparation of mixtures MP). The preliminary mixtures are generally mixed in the melt, using heatable mixing units at suitable temperatures for example, between 150° and 350° C., in kneaders or preferably in extruders, such as single-screw or multiple-screw extruders. With this method, mixtures SKMP are generally obtained as uniform-grain granulated materials with particle sizes of 2 to 5 mm.

Mixtures SKMF of standard plastic SK and dye-dispersant preparations MF generally contain 0.01 to 40 wt %, preferably 0.05 to 25 wt %, particularly preferably 0.1 to 20 wt %, mixture MF of copolymer P and dye, with the fraction of SK supplemented to make up 100 wt %. Amounts of SK generally fall in the range 99.99–60 wt. %, 99.95–75 wt. %, or 99.9–80 wt %. Generally, mixtures SKMF, such as mixtures SKMP, are preferably prepared by melt-mixing. If the dyes exhibit a high volatility, however, and there is concern-that the migration losses or decomposition of the dye assumes undesired forms, then mixtures SKMF are prepared by dissolving mixture components SK and MF in the common solvent and the subsequent removal of the solvent or precipitation of the mixture.

Advantageous effects of the invention

Due to the universal compatibility of copolymers P of the invention, with standard plastics SK, pigments and dyes can be worked into many standard plastics SK with the same dispersant P. This makes possible the universal applicability of mixtures MP (dispersant P and pigment) and MF (dispersant P and dye) in very different plastics SK, without having to adapt dispersant P to the plastic. Furthermore, a uniform distribution of dyes in transparent standard plastics SK is possible with the aid of dispersants P, without impairing their transparency. In addition dispersants P can be prepared according to standardized polymerization methods, wherein monomer components of copolymers P are readily accessible.

Very different pigments and dyes can be worked into standard plastics SK with dispersants P. With a particular copolymerization composition P, very different mixtures MP and MF can be prepared, which can be worked into standard plastics SK equally well.

EXAMPLES

Having generally described this invention, a further understanding can be obtained by reference to certain specific examples which are provided herein for purposes of illustration only and are not intended to be limiting unless otherwise specified.

Examples 1–8

Preparation of various universally compatible pigment binders P

For the preparation of 9 or 10 kg polymer P, 5 kg methyl methacrylate, 3.5 kg cyclohexyl methacrylate, 0.5 kg monomer (m3) and optionally 1 kg monomer (m4) are mixed with 4 g tert-butyl perneodecanoate, 15 g tert-butyl peroctoate, and 150 g 2-mercaptoethanol while stirring. The mixture is degassed for 15 min. Subsequently the mixture is poured into a bag made of polyester film, which lies between two halves of an appropriately dimensioned tin container provided with rubber sealing lips, which is then closed. The polymerization takes place in the chamber immersed in a water bath at 50° C. and lasts 20 h. The contents of the bag, which are solid after this polymerization time, are removed from the chamber, and temperature-conditioned at 110° C. in the conditioning cabinet for 12 h for the final polymerization. The resulting polymer P is ground in a mill with a screen size 8 and can be used either as material for grinding or after degassing extrusion at 150° C., as a granulated material.

TABLE 1

| Example | Monomer (m3) | Monomer (m4) | J values according to DIN 51562 (ml/g) |
|---|---|---|---|
| P 1 | 2-Dimethylamino-ethylmethacrylate | — | 23.3 |
| P 2 | 2-(4-Morpholine)-ethylmethacrylate | — | 26.4 |
| P 3 | 2-[2-(2-Ethoxy-ethoxy)ethoxy]-ethylmethacrylate | — | 27.4 |
| P 4 | N-(2-Methacryloyl-oxyethyl)ethyleneurea | — | 25.8 |
| P 5 | 2-Dimethylamino-ethylmethacrylate | Butylmeth-acrylate | 24.0 |
| P 6 | 2-(4-Morpholine)-ethylmethacrylate | Butylmeth-acrylate | 25.4 |
| P 7 | 2-[2-(2-Ethoxy-ethoxy)ethoxy]-ethylmethacrylate | Butylmeth-acrylate | 25.9 |
| P 8 | N-(2-Methacryloyl-oxyethyl)ethyleneurea | Butylmeth-acrylate | 26.2 |

Comparative Examples 9–10

Preparation of pigment binders P' according to the state of the art.

The preparation of polymers takes place according to Examples 1–8:

TABLE 2

| Example | Composition of the polymer | | J value according to DIN 51562 (ml/g) |
|---|---|---|---|
| P'9 | 95 Parts by weight | Methylmethacrylate | 25.5 |
|  | 5 Parts by weight | 2-Dimethylaminoethyl-methacrylate |  |
| P'10 | 95 Parts by weight | Cyclohexylmethacrylate | 25.1 |
|  | 5 Parts by weight | 2-Dimethylaminoethyl-methacrylate |  |

Examples 11–15

Preparation of mixtures MF of pigment binders P and molecularly dissolved dyes

In addition to 1 kg pigment binder P or P', in accordance with Examples 1–10, 10 g soluble dye THERMOPLAST-GELB® 104 from BASF AG are weighed and mixed in a tumbling mixer for 5 min. The dry mixture formed is subsequently extruded and strand-granulated on a single-screw laboratory extruder from the STORCK COMPANY at 180° C.

TABLE 3

| Example 6 | Mixture | Mixture Components |
|---|---|---|
| 11 | MF 5 | P 5 + THERMOPLASTGELB® 104 |
| 12 | MF 6 | P 6 + THERMOPLASTGELB® 104 |
| 13 | MF 7 | P 7 + THERMOPLASTGELB® 104 |
| 14 | MF 8 | P 8 + THERMOPLASTGELB® 104 |
| 15 (Comparison) | MF '9 | P '9 + THERMOPLASTGELB® 104 |
| 16 (Comparison) | MF '10 | P '10 + THERMOPLASTGELB® 104 |

Examples 17–22

Preparation of mixtures SKMF of thermoplastic standard plastics SK and mixtures MF in accordance with Examples 11–16

For the preparation of 1 kg of a dyed standard plastic SKMF, 50 g of mixtures MF in accordance with Examples 11–15 are mixed with 950 g standard plastic SK in a tumbling mixer and extruded in a single-screw extruder at a screw rotational speed of 70 rpm. The extrusion temperatures are dependent on the type of standard plastic SK and listed below. The compatibility was evaluated visually on the extruded strand. Compatibility between mixing components SK and MF exists if the extruded strand is transparent (+); incompatibility, if the extruded strand has an opaque appearance (–).

The following standard plastics SK are compounded:

TABLE 4

| Abbreviation | Origin | Extrusion Temperature (°C.) |
|---|---|---|
| PP (Polypropylene) | VESTOLEN® 7035 from HülsAG | 200 |
| PS (Polystyrene) | Polystyrene 158 K from BASF AG | 220 |
| SAN (Styrene- | LURAN® 368 R from | 230 |

TABLE 4-continued

| Abbreviation | Origin | Extrusion Temperature (°C.) |
|---|---|---|
| acrylonitrile) | BASF AG | |
| PMMA (Polymethyl methacrylate) | PLEXIGLAS® Y8N from Röhm GmbH | 240 |
| PC (Polycarbonate) | MAKROLON® 3100 from Bayer AG | 250 |
| PVC (Polyvinylchloride) | VESTOLIT® M 6067, Hüls AG | 180 |

TABLE 5

| | | Compatibility Evaluation (transparent +/nontransparent coating–) | | | | | |
|---|---|---|---|---|---|---|---|
| Example | Mixture | PP | PS | SAN | PMMA | PC | PVC |
| 17 | SKMF5 = SK + MF5 | + | + | + | + | + | + |
| 18 | SKMF6 = SK + MF6 | + | + | + | + | + | + |
| 19 | SKMF7 = SK + MF7 | + | + | + | + | + | + |
| 20 | SKMF8 = SK + MF8 | + | + | + | + | + | + |
| 21 | SKMF9 = SK + MF9 | + | – | + | + | – | + |
| 22 | SKMF10 = SK + MF10 | + | + | – | – | – | + |

Examples 23–31

Investigation of the compatibility of pigment binders P, in accordance with Examples 1 to 9, with Polystyrene 158K from BASF 1 g pigment binder P and 1 g Polystyrene 158 K (PS) are dissolved in 10 g 2-butanone at room temperature. The solution is poured into a Petri dish, and the solvent is completely removed at 70° C. and a vacuum of 20 mbar. The resulting film of the polymer mixture is visually evaluated and is investigated on a Kofler heating bench regarding its demixing temperature LCST (temperature at the transition: clear (thermodynamically compatible mixture)→cloudy (thermodynamically incompatible mixture)).

TABLE 6

| Example | Mixture | Film Evaluation | LCST (°C.) |
|---|---|---|---|
| 23 | PS + P1 = 50/50 | clear | 205 |
| 24 | PS + P2 = 50/50 | clear | 205 |
| 25 | PS + P3 = 50/50 | clear | 210 |
| 26 | PS + P4 = 50/50 | clear | 150 |
| 27 | PS + P5 = 50/50 | clear | >240 |
| 28 | PS + P6 = 50/50 | clear | 215 |
| 29 | PS + P7 = 50/50 | clear | 210 |
| 30 | PS + P8 = 50/50 | clear | 165 |
| 31 (Comparison) | PS + P9 = 50/50 | cloudy | <80 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A polymer synthesized from monomers comprising:

(1) 30 to 94.5 wt % methyl methacrylate;

(2) 5 to 50 wt % (meth)acrylate of formula I

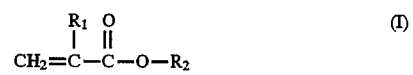

wherein
   $R_1$ is a hydrogen or methyl, and
   $R_2$ is a cycloalkyl radical with 5 to 7 ring carbon atoms; and (3) 0.5 to 20 wt % (meth)acryl compound of formula II

wherein:
   $R_3$ is a hydrogen or methyl; and
   $R_4$ is a substituent containing at least one oxygen or nitrogen atom, and
   Z is NH or $NR_5$, with $R_5=C_{1-6}$ alkyl or $R_4$, or
   $R_4$ is a substituent containing at least one nitrogen atom, a substituent containing a heterocycle having an oxygen atom, or an alkoxy group, and
   Z is O.

2. The copolymer of claim 1, wherein said monomers further comprise:

(4) 0.5 to 30 wt % methacrylate of formula III

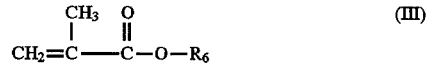

wherein $R_6$ is an alkyl radical with 3 to 24 carbon atoms.

3. The copolymer of claim 1 wherein said (meth)acryl compound of formula II (3) is selected from the group consisting of dialkylaminoalkyl (meth)acrylates, dialkylaminoalkyl(meth)acrylamides, alkoxy (meth)acrylates, alkyl (meth)acrylates and alkyl(meth)acrylamides.

4. The copolymer of claim 1, wherein said copolymer has an average molecular weight $M_w$ of $5\times10^3$ and $5\times10^4$ daltons.

5. The copolymer of claim 1, wherein compound of formula I (2) is selected from the group consisting of cyclopentyl (meth)acrylate, cyclohexyl (meth)acrylate and 4-methylcyclohexyl (meth)acrylate.

6. The copolymer of claim 2, wherein compound of formula III (4) is selected from the group consisting of n-propyl methacrylate, isopropyl methacrylate, isobutyl methacrylate, n-pentyl methacrylate, n-hexyl methacrylate, 2-ethylhexyl methacrylate, n-octyl methacrylate, n-decyl methacrylate, n-dodecyl methacrylate, n-tetradecyl methacrylate, n-hexadecyl methacrylate, n-octadecyl methacrylate, n-eicosyl methacrylate, and n-butyl methacrylate.

7. The copolymer of claim 2, wherein said copolymer comprise 1 to 25 wt % methacrylate of formula III (4).

8. A copolymer synthesized from monomers consisting of:

(1) 30 to 94.5 wt % methyl methacrylate;

(2) 5 to 50 wt % (meth)acrylate of formula I

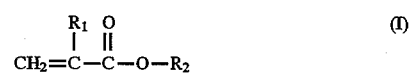

wherein
   $R_1$ is a hydrogen or methyl, and
   $R_2$ is a cycloalkyl radical with 5 to 7 ring carbon atoms;

(3) 0.5 to 20 wt % (meth)acryl compound of formula II

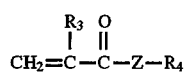 (II)

wherein:

$R_3$ is a hydrogen or methyl, $R_4$ is a substituent containing at least one oxygen or nitrogen atom, and Z is NH or NR5, with R5=$C_{1-6}$ alkyl or $R_4$, or $R_4$ is a substituent containing at least one nitrogen atom, a substituent containing a heterocycle having an oxygen atom, or an alkoxy group and Z is 0

(4) optionally 0.5 to 30 wt % methacrylate of formula III

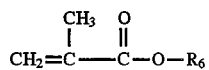 (III)

wherein $R_6$ is an alkyl radical with 3 to 24 carbon atoms.

* * * * *